US012571998B2

(12) United States Patent
Manssen et al.

(10) Patent No.: US 12,571,998 B2
(45) Date of Patent: Mar. 10, 2026

(54) COMPACT IMAGING APPARATUS COMPRISING A FOLDED WIDE ANGLE IMAGING LENS SYSTEM

(71) Applicant: HUAWEI TECHNOLOGIES CO., LTD., Guangdong (CN)

(72) Inventors: Daniel Manssen, Munich (DE); Andreas Brueckner, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 379 days.

(21) Appl. No.: 18/163,942

(22) Filed: Feb. 3, 2023

(65) Prior Publication Data

US 2023/0185062 A1     Jun. 15, 2023

Related U.S. Application Data

(63) Continuation of application No. PCT/EP2020/071886, filed on Aug. 4, 2020.

(51) Int. Cl.
*G02B 13/00*          (2006.01)

(52) U.S. Cl.
CPC ..... *G02B 13/0065* (2013.01); *G02B 13/0045* (2013.01); *G02B 13/007* (2013.01)

(58) Field of Classification Search
CPC ........... G02B 13/0065; G02B 13/0045; G02B 13/007
See application file for complete search history.

(56) References Cited

U.S. PATENT DOCUMENTS

| | | | |
|---|---|---|---|
| 6,144,503 A | 11/2000 | Sugano | |
| 7,227,682 B2 | 6/2007 | Caldwell et al. | |
| 7,283,309 B2 | 10/2007 | Caldwell et al. | |
| 7,605,989 B1 | 10/2009 | Sohn et al. | |
| 9,007,702 B2 | 4/2015 | Tsai | |
| 9,453,991 B2 | 9/2016 | Satoh et al. | |
| 9,927,597 B2 | 3/2018 | Lee et al. | |
| 9,958,651 B2 | 5/2018 | Yeh | |
| 10,234,659 B2 | 3/2019 | Yao et al. | |
| 11,347,016 B2 * | 5/2022 | Shabtay | ............. G02B 27/0149 |

(Continued)

FOREIGN PATENT DOCUMENTS

| | | |
|---|---|---|
| EP | 1748310 A2 | 1/2007 |
| GB | 2512145 A | 9/2014 |

(Continued)

OTHER PUBLICATIONS

International Search Report and Written Opinion issued in PCT/EP2020/071886, dated Apr. 21, 2021, 18 pages.

*Primary Examiner* — Wen Huang

(57) ABSTRACT

An ultra-wide angle imaging apparatus is provided, comprising a first optics having a first optical axis, a second optics having a second optical axis, and a prism placed at an intersection of the first and second optical axis. The prism is configured to reflect light from the first optics to the second optics and the second optics is configured to transmit light from the prism to an image surface. The first optics has a negative optical power, the second optics has a positive optical power, and the prism has an entrance surface for receiving light from the first optics and a reflective inner surface for reflecting light to the second optics. The entrance surface of the prism comprises a paraxial region that is concave.

20 Claims, 16 Drawing Sheets

(56)                    References Cited

U.S. PATENT DOCUMENTS

| | | | |
|---|---|---|---|
| 2002/0041445 A1 | 4/2002 | Nishioka et al. | |
| 2002/0159158 A1 | 10/2002 | Nagata | |
| 2005/0018313 A1* | 1/2005 | Kuba ................. | G02B 13/0035 |
| | | | 359/676 |
| 2007/0053075 A1 | 3/2007 | Kamo | |
| 2008/0062538 A1 | 3/2008 | Liao | |
| 2012/0026384 A1 | 2/2012 | Yamada | |
| 2012/0075728 A1 | 3/2012 | Takakubo et al. | |
| 2012/0327276 A1 | 12/2012 | Ono et al. | |
| 2014/0146217 A1 | 5/2014 | Morooka | |
| 2017/0131526 A1 | 5/2017 | Park et al. | |
| 2018/0343396 A1 | 11/2018 | Daugela et al. | |
| 2020/0073028 A1 | 3/2020 | Shigemitsu et al. | |

FOREIGN PATENT DOCUMENTS

| | | | |
|---|---|---|---|
| JP | 2003098430 A | 4/2003 |
| JP | 2004348082 A | 12/2004 |
| WO | 2018154421 A1 | 8/2018 |
| WO | 2018189818 A1 | 10/2018 |

* cited by examiner

EFL = 1.56 mm, FOV = 140 deg, F-number = 1.95

| Element | Surf-Type | Radius | Thickness | Material | Refractive Index | Abbe # | Conic constant | Clear Aperture in mm: X-Half Width, Y-Half Width |
|---|---|---|---|---|---|---|---|---|
| Object | STANDARD | Plano | Infinity | | | | | |
| L1 S1 | Asphere | 295.7443 | 0.3494 | Plastic | 1.544 | 56.0 | -10.5940 | 4.063* |
| L1 S2 | Asphere | 1.3971 | 1.7572 | | | | -0.8178 | 2.033* |
| L2 S1 | Asphere | 7.7489 | 0.4333 | Plastic | 1.634 | 23.8 | -0.6381 | 2.011* |
| L2 S2 | Asphere | -33.8284 | 0.1415 | | | | -0.9304 | 1.777* |
| Prism S1 | Asphere | -8.3254 | 1.6828 | Plastic | 1.544 | 56.0 | 0.0000 | 1.720* |
| Tilt About X = 45 deg | Coordinate Break | | 0.0000 | | | | 0.0000 | |
| Prism Reflection | STANDARD | Plano | 0.0000 | Mirror | | | 0.0000 | 1.9123* |
| Dummy | STANDARD | Plano | 0.0000 | Plastic | 1.544 | 56.0 | 0.0000 | |
| Tilt About X = 45 deg | Coordinate Break | | -1.6828 | | | | 0.0000 | |
| Prism S2 | Asphere | 14.6355 | -0.0730 | | | | 0.0000 | 1.096* |
| Stop | Standard | Plano | -0.1109 | | | | 0.0000 | 1.0437* |
| L3S1 | Asphere | -2.7352 | -0.9781 | Plastic | 1.544 | 56.0 | -2.3168 | 1.4, 1.32 |
| L3S2 | Asphere | 2.8202 | -0.1831 | | | | -1.4022 | 1.4, 1.32 |
| L4S1 | Asphere | 8.0655 | -0.9373 | Plastic | 1.544 | 56.0 | -1.0087 | 1.52, 1.31 |
| L4S2 | Asphere | 2.0941 | -0.0584 | | | | -5.3855 | 1.52, 1.31 |
| L5S1 | Asphere | 2.1206 | -1.0077 | Plastic | 1.66 | 20.4 | -1.1941 | 1.67, 1.36 |
| L5S2 | Asphere | -18.9083 | -1.6772 | | | | -0.0270 | 1.67, 1.36 |
| L6S1 | Asphere | -47.7332 | -0.5788 | Plastic | 1.544 | 56.0 | -1.9989 | 2.2, 1.8 |
| L6S2 | Asphere | 1.7946 | -0.1755 | | | | -0.9300 | 2.2, 1.8 |
| IR-Cut | STANDARD | Plano | -0.2472 | Glass | 1.5168 | 64.17 | 0.0000 | 2.84, 1.85 |
| | STANDARD | Plano | -0.6459 | | | | 0.0000 | 2.84, 1.85 |
| Sensor | STANDARD | Plano | 0.00E+00 | | | | 0.0000 | 2.83, 1.84 |

Fig. 4

Asphere Coefficients

| Element | A4 | A6 | A8 | A10 | A12 | A14 | A16 |
|---|---|---|---|---|---|---|---|
| L1 S1 | 2.1906E-03 | -5.4428E-05 | 3.2148E-06 | 0.0000 | 0.0000 | 0.0000 | 0.0000 |
| L1 S2 | -2.8142E-02 | 5.7727E-03 | -1.8647E-04 | 0.0000 | 0.0000 | 0.0000 | 0.0000 |
| L2 S1 | -6.4178E-02 | 6.3718E-03 | 1.2288E-03 | -1.6135E-04 | 0.0000 | 0.0000 | 0.0000 |
| L2 S2 | -7.2362E-02 | 2.9271E-02 | -4.8745E-03 | 5.2793E-04 | 0.0000 | 0.0000 | 0.0000 |
| Prism S1 | -3.0348E-02 | 2.1119E-02 | -4.3024E-03 | 0.0000 | 0.0000 | 0.0000 | 0.0000 |
| Prism S2 | 2.00E-02 | 1.67E-03 | -3.23E-03 | 0.0000 | 0.0000 | 0.0000 | 0.0000 |
| L3 S1 | -8.23E-03 | 4.18E-03 | 1.08E-03 | -1.12E-03 | 8.25E-05 | 0.0000 | 0.0000 |
| L3 S2 | -8.80E-02 | 1.21E-01 | -7.80E-02 | 3.06E-02 | -6.04E-03 | 0.0000 | 0.0000 |
| L4 S1 | -7.48E-02 | 1.34E-01 | -6.41E-02 | 1.43E-02 | -1.47E-03 | 0.0000 | 0.0000 |
| L4 S2 | 2.51E-02 | 5.47E-03 | 1.65E-02 | -8.52E-03 | 1.21E-03 | 0.0000 | 0.0000 |
| L5 S1 | 1.34E-02 | -2.54E-02 | 2.50E-02 | -3.90E-03 | -7.51E-04 | 0.0000 | 0.0000 |
| L5 S2 | 3.55E-02 | -2.64E-02 | 1.04E-02 | -1.64E-03 | 6.40E-06 | 0.0000 | 0.0000 |
| L6 S1 | 7.80E-02 | 4.28E-03 | 4.93E-04 | -2.06E-03 | 3.72E-04 | -1.63E-05 | 0.0000 |
| L6 S2 | -4.64E-02 | 2.62E-02 | -2.87E-03 | -1.33E-03 | 3.05E-04 | -1.71E-05 | 0.0000 |

Fig. 5

70 deg

Field angle

Distortion [%]

EFL = 1.64 mm, FOV = 140 deg, F-number = 1.92

| Element | Surf-Type | Radius | Thickness | Material | Refractive Index | Abbe # | Conic constant | Clear Aperture in mm: X-Half Width, Y-Half Width |
|---|---|---|---|---|---|---|---|---|
| Object | STANDARD | Plano | Infinity | | | | | |
| L1 S1 | Asphere | -19.2753 | 0.3692 | Plastic | 1.544 | 56.0 | -10.5940 | 4.58* |
| L1 S2 | Asphere | 1.6012 | 0.8152 | | | | -0.8178 | 2.41* |
| L2 S1 | Asphere | 5.2963 | 0.4079 | Plastic | 1.634 | 23.8 | -0.6381 | 2.35* |
| L2 S2 | Asphere | 11.6281 | 1.1824 | | | | -0.9304 | 1.97* |
| Prism S1 | Asphere | -7.1875 | 1.7668 | Plastic | 1.544 | 56.0 | -0.9304 | 1.75* |
| Tilt About X = 45 deg | Coordinate Break | | 0.0000 | | | | 0.0000 | |
| Prism Reflection | STANDARD | Plano | 0.0000 | Mirror | | | 0.0000 | 1.91* |
| Dummy | STANDARD | Plano | 0.0000 | Plastic | 1.544 | 56.0 | 0.0000 | |
| Tilt About X = 45 deg | Coordinate Break | | -1.7668 | | | | 0.0000 | |
| Stop & Prism S2 | Asphere | 2.3891 | -0.1225 | | | | -0.9304 | 1.147* |
| L3S1 | Asphere | -4.0493 | -1.3076 | Plastic | 1.544 | 56.0 | -2.2893 | 1.57, 1.36 |
| L3S2 | Asphere | -105.8730 | -0.1881 | | | | -1.4234 | 1.61, 1.32 |
| L4S1 | Asphere | -20.8190 | -0.9753 | Plastic | 1.544 | 56.0 | -90.0000 | 1.61, 1.46 |
| L4S2 | Asphere | 3.0135 | -0.1044 | | | | -5.3763 | 1.69, 1.46 |
| L5S1 | Asphere | 2.3310 | -0.7148 | Plastic | 1.66 | 20.4 | -1.1887 | 1.63, 1.47 |
| L5S2 | Asphere | -8.3593 | -0.9900 | | | | -94.7775 | 2.01, 1.47 |
| L6S1 | Asphere | -7.0962 | -1.8071 | Plastic | 1.544 | 56.0 | -12.6087 | 2.68, 1.9 |
| L6S2 | Asphere | 1.6811 | -0.1850 | | | | -0.9307 | 2.85, 1.9 |
| IR-Cut | STANDARD | Plano | -0.2599 | Glass | 1.5168 | 64.17 | 0.0000 | 2.85, 2 |
| | STANDARD | Plano | -0.6792 | | | | 0.0000 | 2.85, 2 |
| Sensor | STANDARD | Plano | 0.00 | | | | 0.0000 | 2.83, 1.84 |

Fig. 11

Asphere Coefficients

| Element | A4 | A6 | A8 | A10 | A12 | A14 | A16 |
|---|---|---|---|---|---|---|---|
| L1 S1 | 3.6491E-03 | -1.0211E-04 | 2.2733E-06 | 2.9571E-09 | 0.0000 | 0.0000 | 0.0000 |
| L1 S2 | -3.6327E-02 | 1.2247E-02 | -1.4466E-03 | 1.6484E-06 | 0.0000 | 0.0000 | 0.0000 |
| L2 S1 | -7.1981E-03 | 1.9804E-02 | -5.1212E-03 | 3.7154E-04 | 0.0000 | 0.0000 | 0.0000 |
| L2 S2 | 9.8467E-03 | 2.0377E-02 | -7.1018E-03 | 9.6388E-04 | 0.0000 | 0.0000 | 0.0000 |
| Prism S1 | -1.8780E-02 | 2.2353E-03 | -1.2936E-03 | 1.9424E-04 | 0.0000 | 0.0000 | 0.0000 |
| Prism S2 | -7.1396E-04 | -1.0809E-02 | 6.7081E-03 | -1.5753E-03 | 0.0000 | 0.0000 | 0.0000 |
| L3S1 | 4.2807E-03 | -2.0077E-02 | 1.2029E-02 | -4.0306E-03 | 5.0950E-04 | 0.0000 | 0.0000 |
| L3S2 | 7.2632E-02 | 1.9197E-02 | -3.4275E-02 | 1.5516E-02 | -2.8121E-03 | 0.0000 | 0.0000 |
| L4S1 | 3.5431E-02 | 6.3815E-02 | -3.5383E-02 | 8.1431E-03 | -1.1745E-03 | 0.0000 | 0.0000 |
| L4S2 | 2.1904E-02 | 7.3842E-02 | -6.9400E-02 | 2.4961E-02 | -3.1604E-03 | 0.0000 | 0.0000 |
| L5S1 | 9.7891E-02 | -9.3937E-02 | 2.7567E-02 | -1.3098E-02 | -4.4162E-05 | 0.0000 | 0.0000 |
| L5S2 | 6.9157E-02 | -9.0371E-02 | 3.6343E-02 | -6.5835E-02 | 4.6402E-04 | 0.0000 | 0.0000 |
| L6S1 | 4.5592E-02 | -1.0517E-02 | 1.3914E-03 | -1.7523E-04 | 1.5813E-05 | -6.3578E-07 | 0.0000 |
| L6S2 | -8.4213E-02 | 2.9702E-02 | -6.2816E-03 | 8.1817E-04 | -5.8082E-05 | 1.5378E-06 | 0.0000 |

Fig. 12

COMPACT IMAGING APPARATUS COMPRISING A FOLDED WIDE ANGLE IMAGING LENS SYSTEM

CROSS-REFERENCE TO RELATED APPLICATIONS

This application is a continuation of International Application No. PCT/EP2020/071886, filed on Aug. 4, 2020, the disclosure of which is hereby incorporated by reference in its entirety.

TECHNICAL FIELD

The present disclosure relates to optical imaging apparatuses. More specifically, the disclosure relates to a compact optical imaging apparatus comprising a folded wide angle imaging lens system, for instance, for a camera of an electronic portable device, such as a smartphone, tablet computer and the like.

BACKGROUND

Current ultra-wide angle imaging systems for smartphones have a full Field of View (FOV) that is generally less than 130 degrees (deg). Increasing FOVs of conventional compact up-right lens architectures results in a large decay of the relative illumination towards the edges of the image. Due to the diffraction limit, this reduced relative illumination limits the maximum achievable modulation transfer function (MTF) of the lens and thus the image quality. To achieve a good MTF over the entire FOV, the relative illumination of an imaging system should be several times larger than the relative illumination predicted by the natural cosine-fourth-power law of illumination. FIG. 1 shows the diffraction limited MTF at 125 lines/mm as a function of relative illumination for a system F-number 1.8 (upper curve) and 2.0 (lower curve).

The relative illumination can be increased either by allowing for a significant amount of distortion or by a reduction of the chief ray angle on the image surface as well as in the plane of the system's aperture stop.

Introducing distortion, however, is quite limited as this will have a negative impact on the image quality of the lens. To avoid the unnatural appearance of geometrical details in the image or video, distortion is typically compensated by software algorithms in a post-processing step. However, this has a negative impact on picture and video quality. Additionally, it results in a smaller useable image circle and thus a reduced FOV. Moreover, the post-processing steps for compensating distortion are time consuming and, therefore, usually cannot be used for videos with high frame rates. Furthermore, post-processing can also generate non-realistic image artefacts.

A reduction of the chief ray angles generally leads to lens systems with an increased total track length (TTL), which cannot be accommodated in the housing of a smartphone.

SUMMARY

It is an object to provide a compact optical imaging apparatus with a folded wide angle imaging lens system, for instance, for a camera of an electronic portable device, such as a smartphone, tablet computer and the like.

The foregoing and other objects are achieved by the subject matter of the independent claims. Further implementation forms are apparent from the dependent claims, the description and the figures.

According to a first aspect, an imaging apparatus is provided, comprising a first optics (i.e. a first optical assembly) having a first optical axis, a second optics (i.e. a second optical assembly) having a second optical axis, and a prism placed at an intersection of the first and the second optical axis. The first optics is configured to transmit light to the prism, the prism is configured to reflect light from the first optics to the second optics, and the second optics is configured to transmit light from the prism to an image surface. The first optics has a negative optical power, the second optics has a positive optical power, and the prism has an entrance surface for receiving light from the first optics and a reflective inner surface for reflecting light to the second optics. The entrance surface of the prism comprises a paraxial region that is concave.

Thus, an ultra-wide angle imaging apparatus is provided, where the optical axis is folded at least once (e.g., by the prism). This allows increasing the optical path length of the apparatus to reduce the chief ray angles in a stop plane and an image surface and, thus, greatly improves the relative illumination and consequently the image quality without sacrificing tight depth requirements, which have to be met, for instance, by a smartphone camera. In a further possible implementation form of the first aspect, the first optical axis and the second optical axis intersect perpendicularly.

In a further possible implementation form of the first aspect, the second optics comprises an aperture stop of the imaging apparatus. In an implementation form, the second optics may comprise a diaphragm that is the aperture stop. In another implementation form, the aperture stop is defined by one or more lenses of the second optics.

In a further possible implementation form of the first aspect, the imagining apparatus comprises an aperture stop between the prism and the second optics. In an implementation form, the aperture stop may be a diaphragm.

In a further possible implementation form of the first aspect, an aperture stop of the imaging apparatus is defined by an exit surface of the prism.

In a further possible implementation form of the first aspect, the prism has an exit surface that is flat.

In a further possible implementation form of the first aspect, an exit surface of the prism comprises a paraxial region that is concave or convex.

In a further possible implementation form of the first aspect, the prism comprises a base prism and a lens adhesively bonded to an exit surface of the base prism. The exit surface of the base prism may be flat. The lens may for example be cemented or imprinted onto the exit surface of the base prism. The exit surface of the prism, or at least its concave or convex paraxial region, may thus be provided by the lens bonded to the base prism.

In a further possible implementation form of the first aspect, the prism comprises a base prism and a lens adhesively bonded to an entrance surface of the base prism. The entrance surface of the base prism may be flat. The lens may for example be cemented or imprinted onto the entrance surface of the base prism. The aspheric entrance surface of the prism, or at least its concave shape in the paraxial region, may thus be provided by the lens bonded to the base prism.

In a further possible implementation form of the first aspect, the first optics comprises a first lens and a second lens placed after the first lens, wherein the first lens has a negative optical power and the second lens has a positive optical power. As will be appreciated, the relative "term" is used herein with the following understanding. An optical element B in an optical system is said to be placed "after" an optical element A if light entering the optical system reaches B via A, i.e. if B is placed on an exit side of A, e.g. placed behind A (if placed on a same optical axis, for example).

In a further possible implementation form of the first aspect, the second optics comprises a first lens, a second lens, a third lens and a fourth lens, placed after each other in this order, wherein the first lens has a positive optical power, the second lens has a positive optical power, the third lens has a negative optical power and the fourth lens has a positive optical power.

In a further possible implementation form of the first aspect, the prism is configured to reflect light from the first optics to the second optics by total internal reflection, or the reflective internal surface of the prism is provided by a reflective coating.

In a further possible implementation form of the first aspect, the reflective internal surface of the prism is flat or has a freeform shape.

In a further possible implementation form of the first aspect, the second optics comprises one or more lenses, wherein each of the lenses of the second optics has a rotationally symmetric sag profile with a truncated clear aperture at one or both linear sides thereof. Advantageously, this allows to even further reduce the spatial dimensions, in particular the TTL of the imaging apparatus.

In a further possible implementation form of the first aspect, the clearance between the first optics and the second optics is larger than 0.3 mm.

In a further possible implementation form of the first aspect, the second optics comprises one or more lenses that are movable along the second optical axis for internal focusing, e.g. to generate sharp images on a fixed image surface for different object distances.

In a further possible implementation form of the first aspect, the full field of view of the imaging apparatus is between 130° and 180°.

In a further possible implementation form of the first aspect, the imaging apparatus has a chief ray angle range within −40 degrees and +40 degrees in the plane of the aperture stop over the entire field of view of the imaging apparatus.

In a further possible implementation form of the first aspect, the imaging apparatus has a chief ray angle range within −37 degrees and +37 degrees in the image surface over the entire field of view of the imaging apparatus.

In a further possible implementation form of the first aspect, a lens distortion of the imaging apparatus is within a range of −30% and +30% over the entire field of view of the imaging apparatus.

In a further possible implementation form of the first aspect, the imaging apparatus further comprises a near-infrared cut-off filter and/or a cover glass, wherein the near-infrared cut-off filter and/or the cover glass are placed on the second optical axis after the second optics.

In a further possible implementation form of the first aspect, the second optics comprises one or more lenses, wherein an entrance surface of the lens of the one or more lenses of the second optics closest to the prism is placed on the second optical axis at a distance from the prism that is smaller than or equal to a maximum clear aperture semi-diameter of the first optics.

In a further possible implementation form of the first aspect, the imaging apparatus further comprises an image sensor placed on the second optical axis after the second optics for sensing light on the image surface.

According to a second aspect a portable device is provided, comprising an imaging apparatus according to the first aspect described above.

In a further possible implementation form of the second aspect, the portable device is a smartphone or a tablet computer.

Details of one or more embodiments are set forth in the accompanying drawings and the description below. Other features, objects, and advantages will be apparent from the description, drawings, and claims.

BRIEF DESCRIPTION OF THE DRAWINGS

In the following embodiments of the technology are described in more detail with reference to the attached figures and drawings, in which:

FIG. 4 is an example table listing exemplary lens parameters of the imaging apparatus of FIG. 2;

FIG. 5 is an example table listing asphere coefficients of the lenses of the imaging apparatus of FIG. 2;

FIG. 11 is an example table listing exemplary lens parameters of the imaging apparatus of FIG. 10;

FIG. 12 is an example table listing asphere coefficients of the lenses of the imaging apparatus of FIG. 10;

In the following identical reference signs refer to identical or at least functionally equivalent features.

DETAILED DESCRIPTION OF THE EMBODIMENTS

In the following description, reference is made to the accompanying figures, which form part of the disclosure, and which show, by way of illustration, specific aspects of embodiments of the technology or specific aspects in which embodiments of the present technology may be used. It is understood that embodiments of the technology may be used in other aspects and comprise structural or logical changes not depicted in the figures. The following detailed description, therefore, is not to be taken in a limiting sense, and the scope of the present technology is defined by the appended claims.

For instance, it is to be understood that a disclosure in connection with a described method may also hold true for a corresponding device or system configured to perform the method and vice versa. For example, if one or a plurality of specific method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

Figure 1:
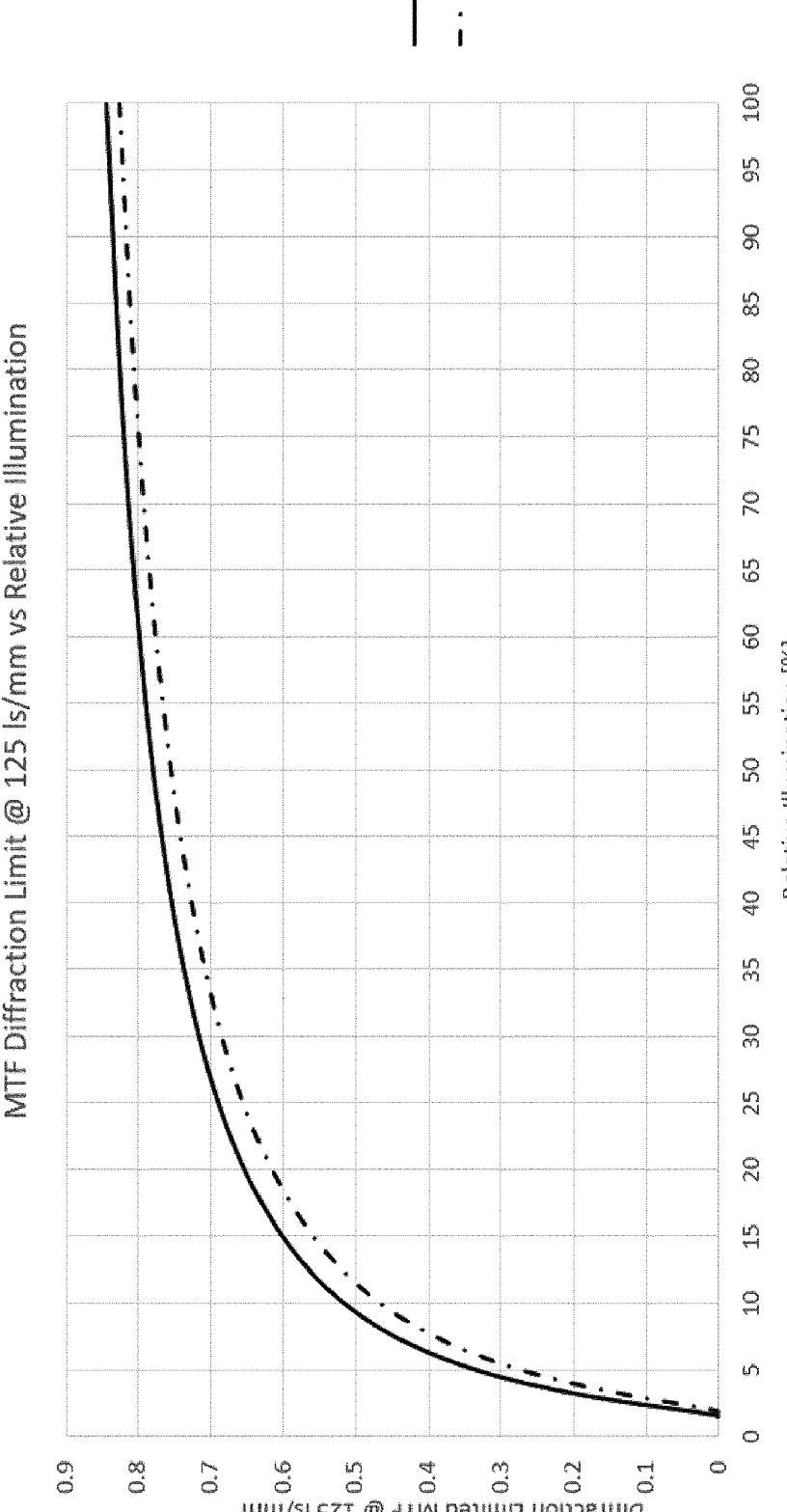
FIG. 1 is an example diagram illustrating the diffraction limited MTF at 125 lines/mm as a function of relative illumination for a system's F-number 1.8 (upper curve) and 2.0 (lower curve)
Figure 2:
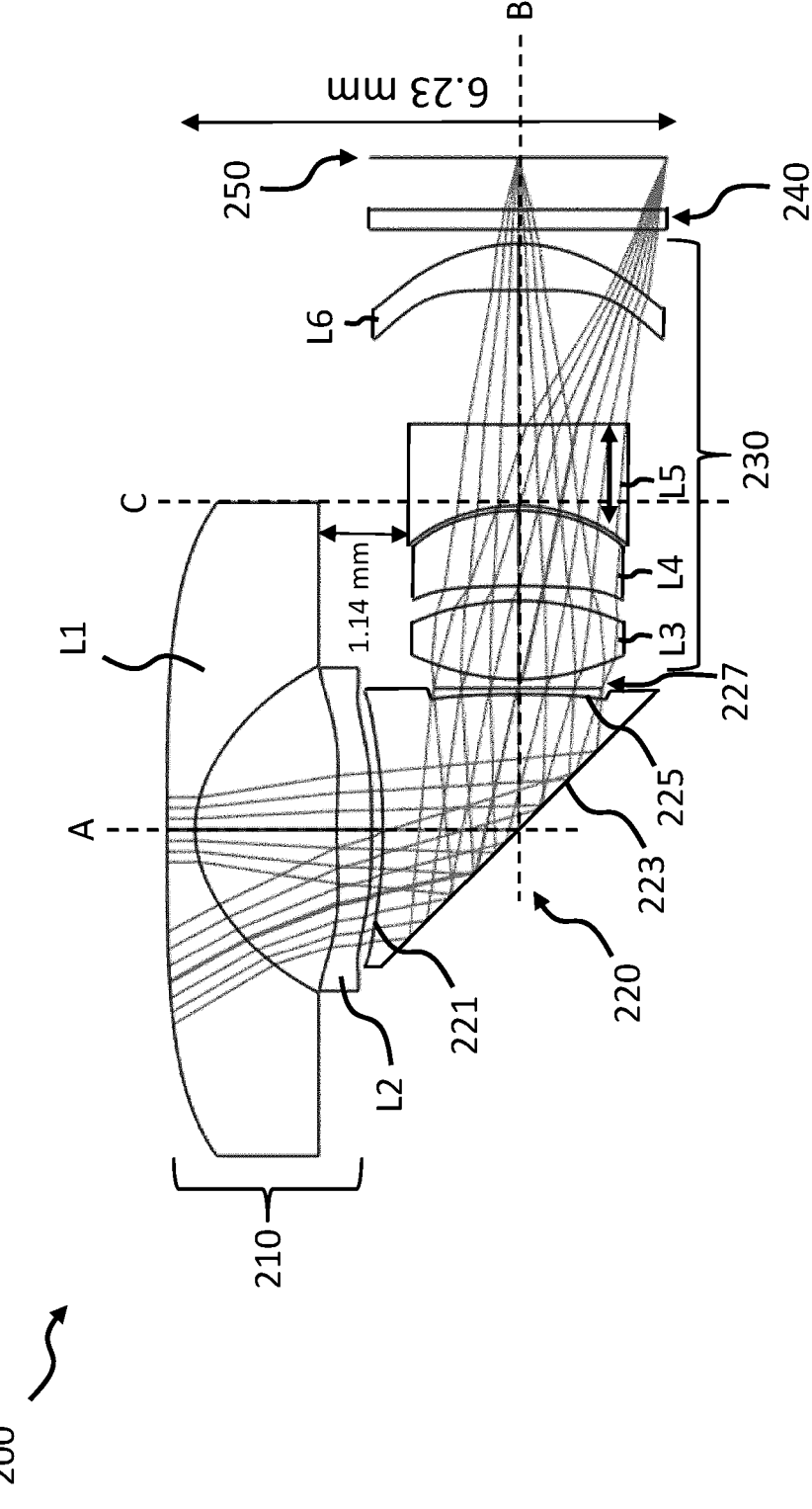
FIG. 2 is an example diagram illustrating a schematic cross-sectional view of an imaging apparatus according to an embodiment.

FIG. 2 is a diagram illustrating an imaging apparatus 200 according to an embodiment. In an embodiment, the imaging apparatus is part of a camera for a portable electronic device, such as a smartphone, a tablet computer or the like.

The imaging apparatus 200 comprises a first optics 210, i.e. a first group of optical elements 210 having a first optical axis A, a second optics, i.e. a second group of optical elements 230 having a second optical axis B, and a prism 220 placed at an intersection of the first optical axis A and the second optical axis B. As can be taken from FIG. 2, the first optics 210 with the first optical axis A and the second optics 230 with the second optical axis B are arranged in a folded configuration. In the embodiment shown in FIG. 2, the first optical axis A and the second optical axis B intersect perpendicularly, i.e. define an angle of 90°. In other embodiments the first optical axis A and the second optical axis B may intersect at a different angle, such as, for instance, 80° or 100°.

As can be taken from FIG. 2, the first optics 210 has a negative optical power and is configured to transmit light to the prism 220, the prism 220 is configured to reflect light from the first optics 210 to the second optics 230, and the second optics 230 has a positive optical power and is configured to transmit light from the prism 220 to an image surface 250. The prism 220 contains a tilted reflective surface 223, which folds the optical system by 90 degrees. In the embodiment illustrated in FIG. 2 the imaging apparatus 200 further comprises an image sensor placed after the second optics 230 for sensing light on the image surface 250. In the embodiment illustrated in FIG. 2, the imaging apparatus 200 further comprises a near-infrared cut-off filter 240 being arranged between the lenses L3, L4, L5 and L6 of the second optics 230 and the image surface 250 on the second optical axis B. In a further embodiment, the imaging apparatus 200 may further comprise a cover glass being placed on the second optical axis B after the lenses L3, L4, L5 and L6 of the second optics 230. In an embodiment, the near-infrared cut-off filter 240 may be a coating on the cover glass.

In an embodiment, the prism 220 is configured to reflect light from the first optics 210 to the second optics 230 by total internal reflection. In an embodiment, the reflective internal surface 223 of the prism 220 may comprise a reflective coating. The reflective internal surface 223 of the prism 220 may be flat, as illustrated in FIG. 2, or may have a freeform shape, for instance, a freeform shape having a rotationally non-symmetric sag profile.

As illustrated in FIG. 2, the prism 220 has an entrance surface 221 for receiving light from the first optics 210 and a reflective inner surface 223 for reflecting light to the second optics 230. The entrance surface 221 of the prism 220 comprises a paraxial region that is concave.

In the embodiment illustrated in FIG. 2, the imaging apparatus 200 has a full field of view (FOV) of 140° along the diagonal of the image surface 250. In an embodiment, the FOV of the imaging apparatus 200 may be in the range between 130° and 180°. The F-number of the imaging apparatus 200 illustrated in FIG. 2 is 1.95. The overall system depth is 6.23 mm.

In the embodiment shown in FIG. 2, the first optics 210 comprises a first lens L1 and a second lens L2 placed after the first lens L1, wherein the first lens L1 has a negative optical power and the second lens L2 has a positive optical power. The second optics 230 comprises a first lens L3, a second lens L4, a third lens L5 and a fourth lens L6, placed after each other in this order. The first lens L3 has a positive optical power, the second lens L4 has a positive optical power, the third lens L5 has a negative optical power and the fourth lens L6 has a positive optical power. In the embodiment shown in FIG. 2, the first optics 210, i.e. the lenses L1 and L2, has a focal length of −4.605 mm, wherein the first lens L1 has a focal length of −2.581 mm and the second lens L2 has a focal length of 9.985 mm (as used herein a negative focal length corresponds to a lens with negative optical power). The second optics 230, i.e. the lenses L3, L4, L5 and L5, has a focal length of 4.370 mm, wherein the first L3, the second L4, the third L5 and the fourth lens L6 of the second optics 230 have focal lengths of 2.721 mm, 4.927 mm, −2.835 mm and 3.192 mm, respectively.

As illustrated in FIG. 2, the imaging apparatus 200 may further comprise an aperture stop 227. In an embodiment, the second optics 230 comprises a diaphragm 227 that is the aperture stop 227. In another embodiment, the aperture stop is defined by one or more lenses of the second optics 230. As illustrated in FIG. 2, the aperture stop 227 may be located between the prism 220 and the lenses of the second optics 230. In a further embodiment (illustrated in FIG. 10), the aperture stop 227 of the imaging apparatus 200 is defined by an exit surface 225 of the prism 220.

In the embodiment shown in FIG. 2, the prism 220 has an exit surface 225 with a paraxial region that is convex. In other embodiments, the prism 220 may have an exit surface 225 that is flat or an exit surface 225 comprising a paraxial region that is concave.

In an embodiment, the prism 220 of the imaging apparatus 200 illustrated in FIG. 2 may be provided by a base prism with a lens adhesively bonded to the exit surface of the base prism. The exit surface of the base prism may be flat. The lens may, for example, be cemented or imprinted onto the exit surface of the base prism. The exit surface 225 of the prism 220, or at least its concave or convex paraxial region, may, thus, be provided by the lens bonded to the base prism.

Likewise, a lens may be adhesively bonded to a flat entrance surface of the base prism for providing the entrance surface 221 of the prism 220 of the imaging apparatus shown in FIG. 2. The lens may, for example, be cemented or imprinted onto the entrance surface of the base prism. The aspheric entrance surface 221 of the prism 220, or at least its concave shape in the paraxial region, may thus be provided by the lens bonded to the base prism.

Figure 3:
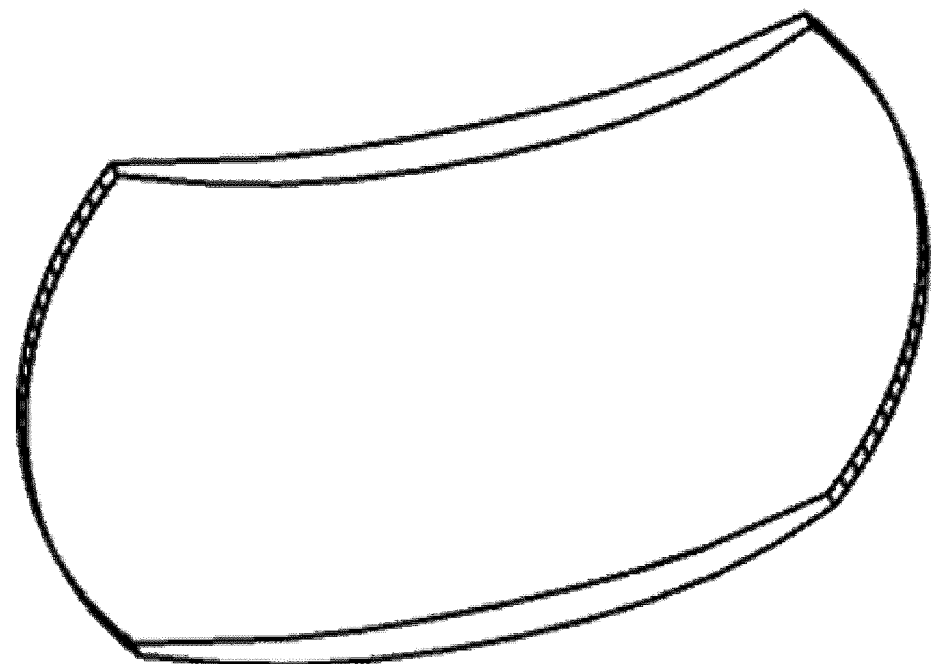
FIG. 3 is an example perspective view of a lens with truncated clear aperture of an imaging apparatus according to an embodiment.

In an embodiment, the lenses L3, L4, L5, and L6 of the second optics 230 may have aspheric surfaces, i.e. surfaces with a rotationally symmetric sag profile with a truncated clear aperture at one or both linear sides thereof, as illustrated in FIG. 3 (where the clear lens element aperture is truncated down in the vertical direction at both sides). This allows maximizing the clearance between the lenses of the first optics 210 and the lenses of the second optics 230, which in the embodiment illustrated in FIG. 2 is 1.14 mm. In an embodiment, the clearance between the first optics 210 and the second optics 230 is larger than 0.3 mm. In an embodiment, the entrance surface of the lens of the second optics 230 closest to the prism 220 (e.g. in the embodiment shown in FIG. 2 the entrance surface S1 of the lens L3) is placed on the second optical axis B at a distance from the prism 220 (more specifically, from the exit surface of the prism 220) that is smaller than or equal to a maximum clear aperture semi-diameter of the lenses L1 and L2 of the first optics 210. This is illustrated in FIG. 2 by the fact that the line C defined by an edge of the lens L1 (which has a larger clear aperture semi-diameter than the lens L2) has a larger distance along the optical axis B to the exit surface of the prism 220 than the entrance surface S1 of the lens L3 In other words, in the embodiment shown in FIG. 2 the entrance surface S1 of the lens L3 is located "left" of the line C.

In an embodiment, one or more of the lenses L3, L4, L5, L6 of the second optics 230 of the imaging apparatus 200 may be configured to be moved along the second optical axis B, e.g. by a voice coil motor, for focusing the imaging apparatus 200. For instance, in the embodiment shown in FIG. 2 the third lens L5 of the second optics 230 is movable along the second optical axis B for focusing the imaging apparatus 200. Consequently, the imaging apparatus 200 can achieve sharp images for different object distances.

FIG. 4 shows a table listing exemplary lens parameters of the imaging apparatus 200 of FIG. 2, including the surface type, the radius of curvature, the axial thickness, the refractive index, the Abbe number, the conic constant, and the semi horizontal and vertical widths of the clear apertures of each lens L1-L6, while FIG. 5 shows a table listing the asphere coefficients of the different lens surfaces of the imaging apparatus 200 of FIG. 2. As will be appreciated by the person skilled in the art, S1 designates the entrance surface, while S2 denotes the exit surface of a respective lens L1-L6 in the direction defined by the optical path of the imaging apparatus 200. In the table shown in FIG. 4 the clear apertures marked with "*" have a circular shape with a corresponding semi-half diameter, while all other clear apertures have a rectangular shape. The sag height z(h) profile of the asphere surfaces listed in the table shown in FIG. 4 can be calculated on the basis of the following equation:

$$z(h)=ch^2/\{1+[1-(k+1)c^2h^2]1/2\}+A4h4+A6h6+A8h8+A10h10+A12h12+A14h14+A16h16,$$

where c is the reciprocal of the radius of curvature, h is the transversal distance w.r.t the optical axis, k is the conic constant and A4, A6, A8, A10, A12, A14, and A16 are the asphere coefficients, which are provided in the table shown in FIG. 5.

Figure 6:
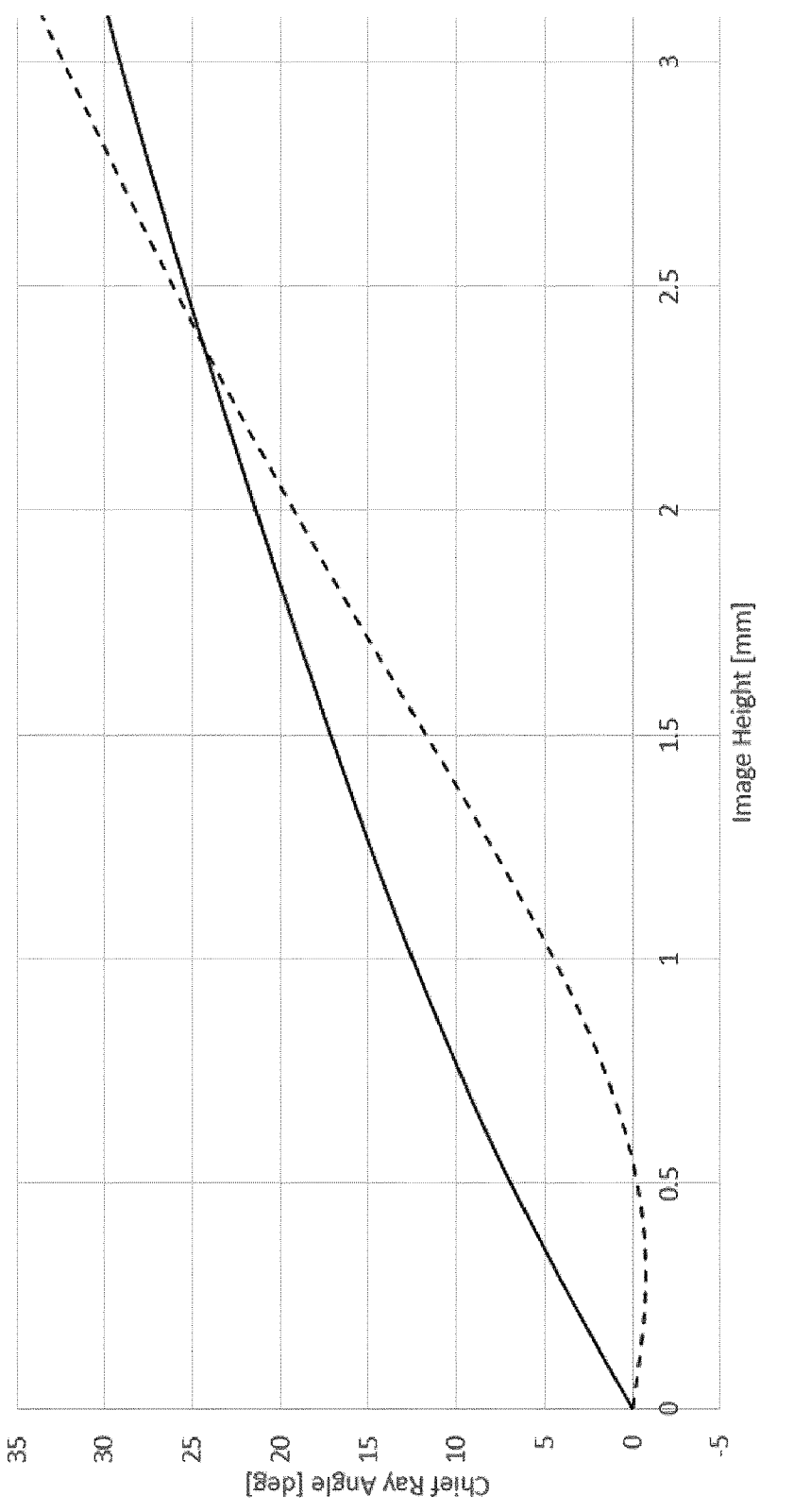
FIG. 6 is an example diagram illustrating the chief ray angle at the image surface and the stop plane of the imaging apparatus of FIG. 2 as a function of the image height.

FIG. 6 is a diagram illustrating the chief ray angle (CRA) at the image surface 250 and the stop plane of the imaging apparatus 200 of FIG. 2 as a function of the image height. As can be taken from FIG. 6, for the imaging apparatus 200 of FIG. 2 the CRA ranges between −34° and +34° over the entire FOV in the image plane and between −30° and +30° in the stop plane. In an embodiment, the first optics 210, e.g. the lenses L1 and L2 and the prism 220 are configured to provide a chief ray angle range within −40 degrees and +40 degrees in the plane of the aperture stop 227 over the entire field of view of the imaging apparatus 200. In an embodiment, the imaging apparatus 200 has a chief ray angle range within −37 degrees and +37 degrees in the image plane over the entire field of view of the imaging apparatus 200.

Figure 7:
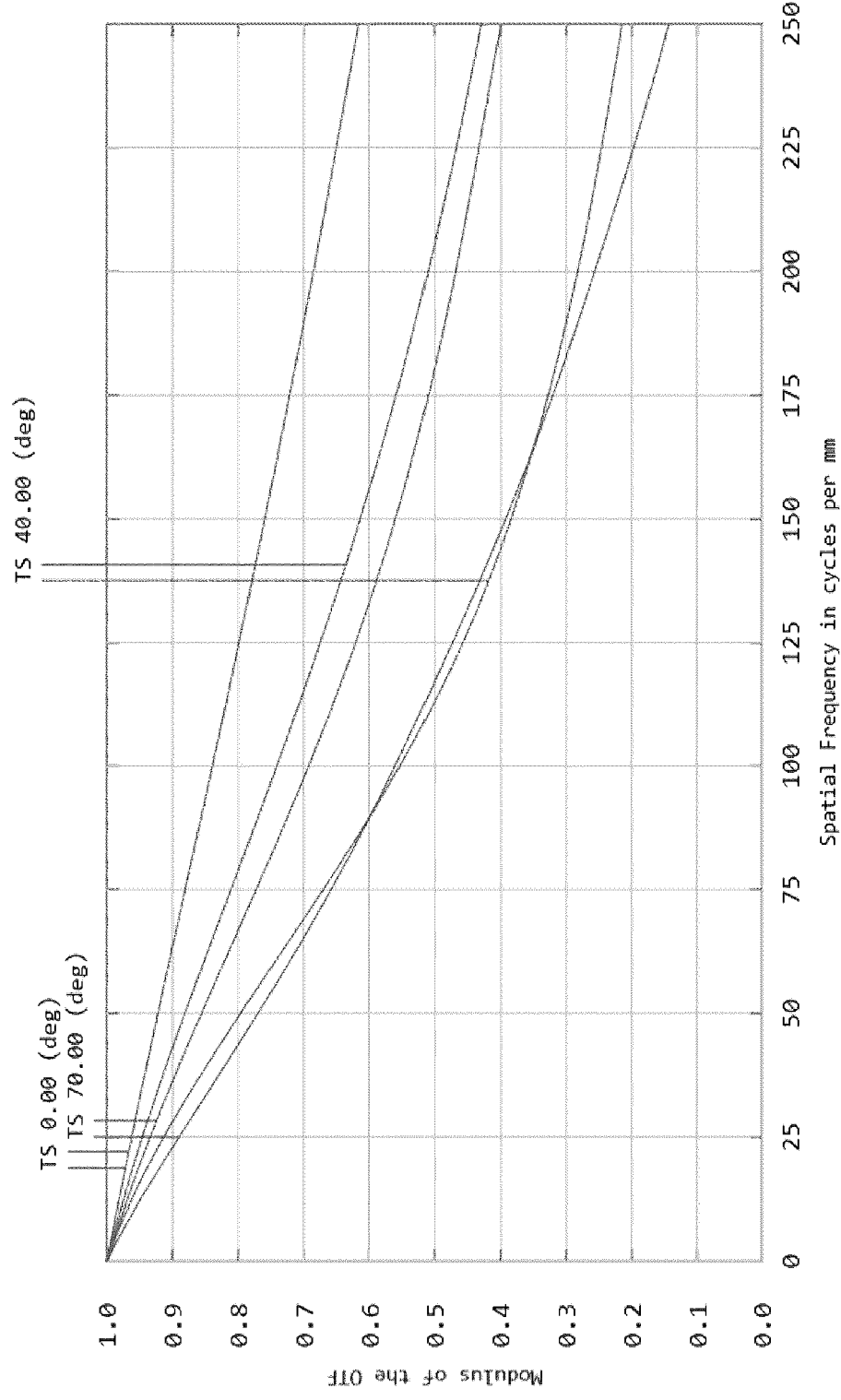
FIG. 7 is an example diagram illustrating the modulation transfer function of the imaging apparatus of FIG. 2 for on-axis as well as off-axis fields for infinite object distance.
Figure 8:
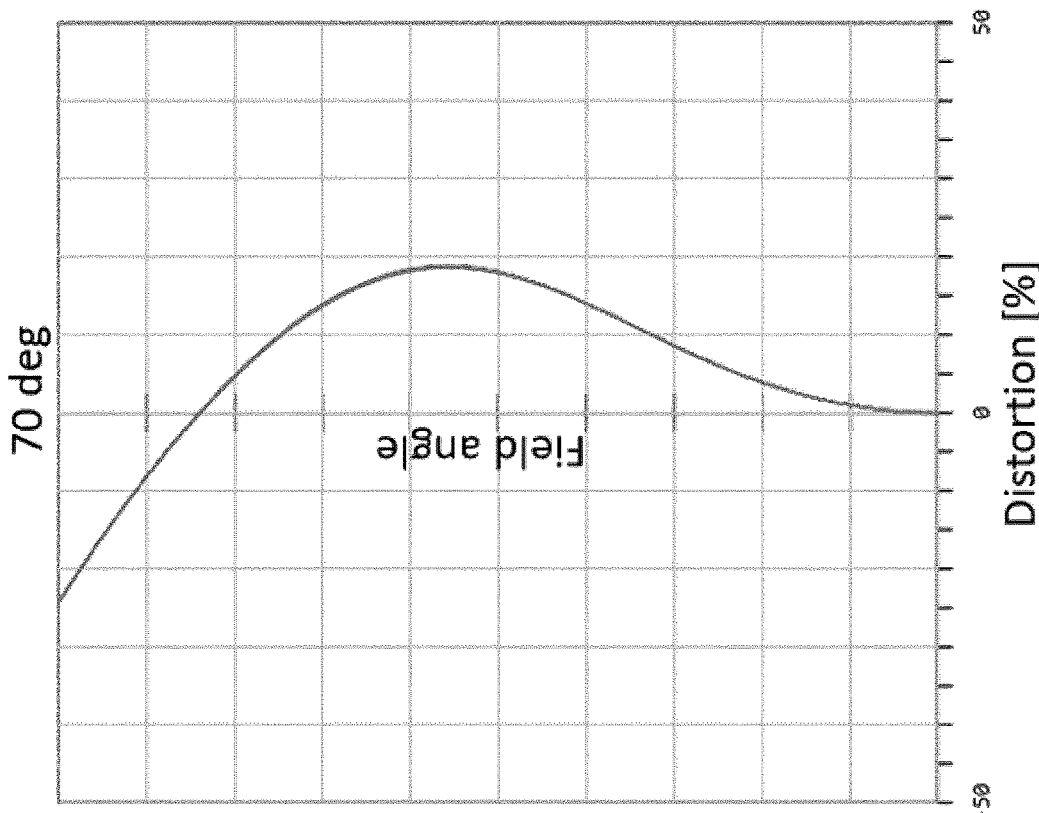
FIG. 8 is an example diagram illustrating the distortion as a function of the field angle of the imaging apparatus of FIG. 2.
Figure 9:
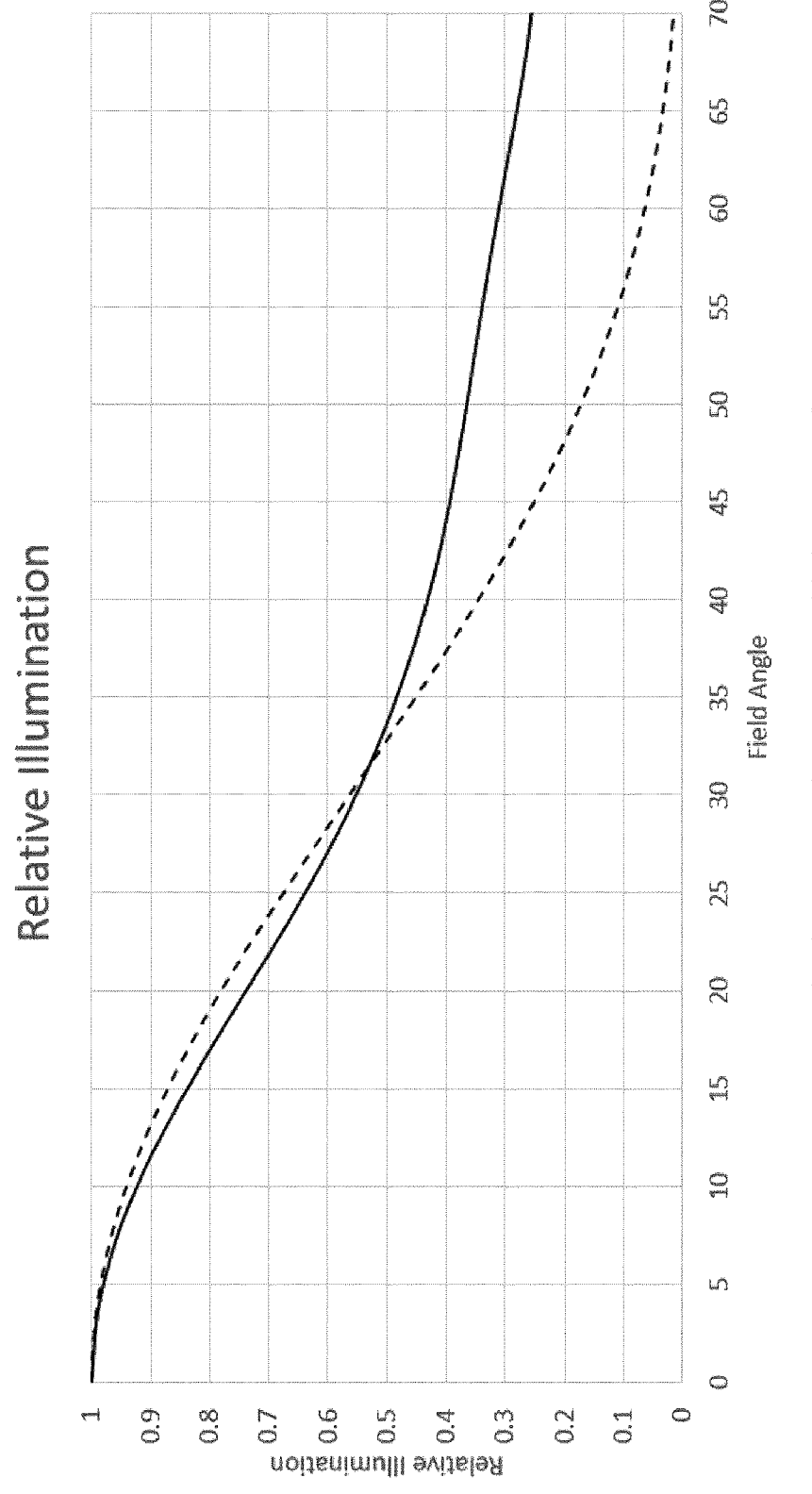
FIG. 9 is an example diagram illustrating the relative Illumination as a function of the field angle of the imaging apparatus of FIG. 2.

FIG. 7 shows a diagram illustrating the modulation transfer function of the imaging apparatus 200 of FIG. 2 for on-axis as well as off-axis fields for infinite object distance. As can be taken from FIG. 8, which illustrates the distortion as a function of the field angle, the imaging apparatus 200 of FIG. 2 provides a distortion within a range of −25% and +20%. In an embodiment, the lens distortion of the imaging apparatus 200 is within a range of −30% and +30% over the entire field of view of the imaging apparatus 200. As can be taken from FIG. 9, which shows a diagram illustrating the relative illumination as a function of the field angle as well as the natural cosine-fourth-power law function for comparison, the imaging apparatus 200 of FIG. 2 has a relative illumination larger than 24% across the entire FOV.

Figure 10:
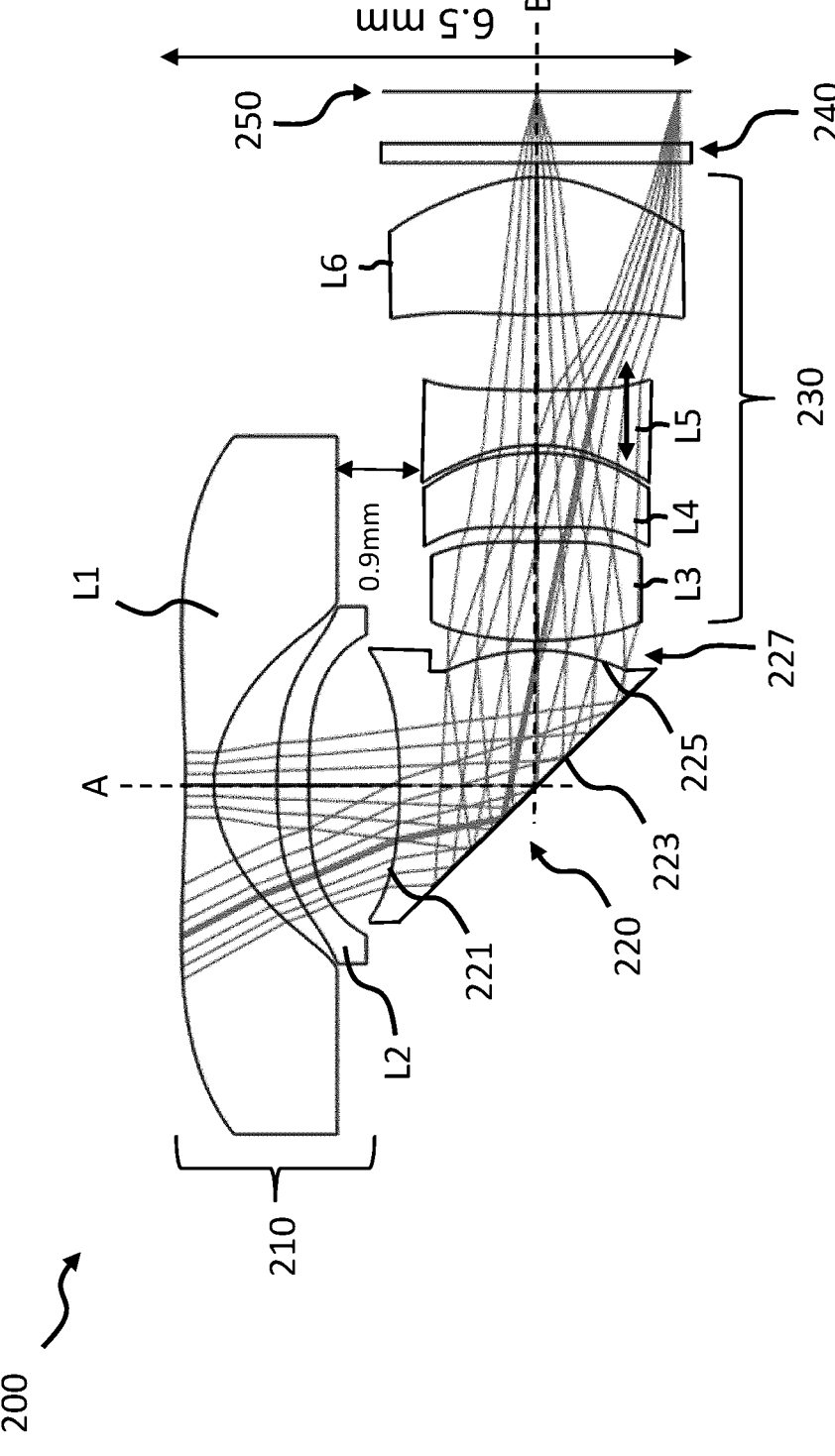
FIG. 10 is an example diagram illustrating a schematic cross-sectional view of an imaging apparatus according to an embodiment.

Another embodiment of the imaging apparatus 200 is shown in FIG. 10. As will be appreciated, FIGS. 11 to 16 provide the same kind of information for the embodiment of the imaging apparatus 200 shown in FIG. 10, as FIGS. 4 to 9 for the embodiment of the imaging apparatus 200 shown in FIG. 2.

The imaging apparatus 200 shown in FIG. 10 has a field of view (FOV) of 140° along the diagonal of the image surface 250. The F-number of the imaging apparatus 200 of FIG. 10 is 1.92. The overall system depth is 6.50 mm. In the embodiment shown in FIG. 10, the first optics 210 has a focal length of −3.474 mm, wherein the first lens L1 has a focal length of −2.701 mm and the second lens L2 has a focal length of 14.967 mm.

Different to the embodiment shown in FIG. 2, in the embodiment shown in FIG. 10 the aperture stop 227 is defined by the exit surface 223 of the prism 220, which has an aspheric sag profile with convex shape in the paraxial region. As can be taken from FIG. 13, the chief ray angle (CRA) of the imaging apparatus 200 of FIG. 10 ranges between −17 deg and +17 deg in the stop plane over the entire FOV.

Figure 13:
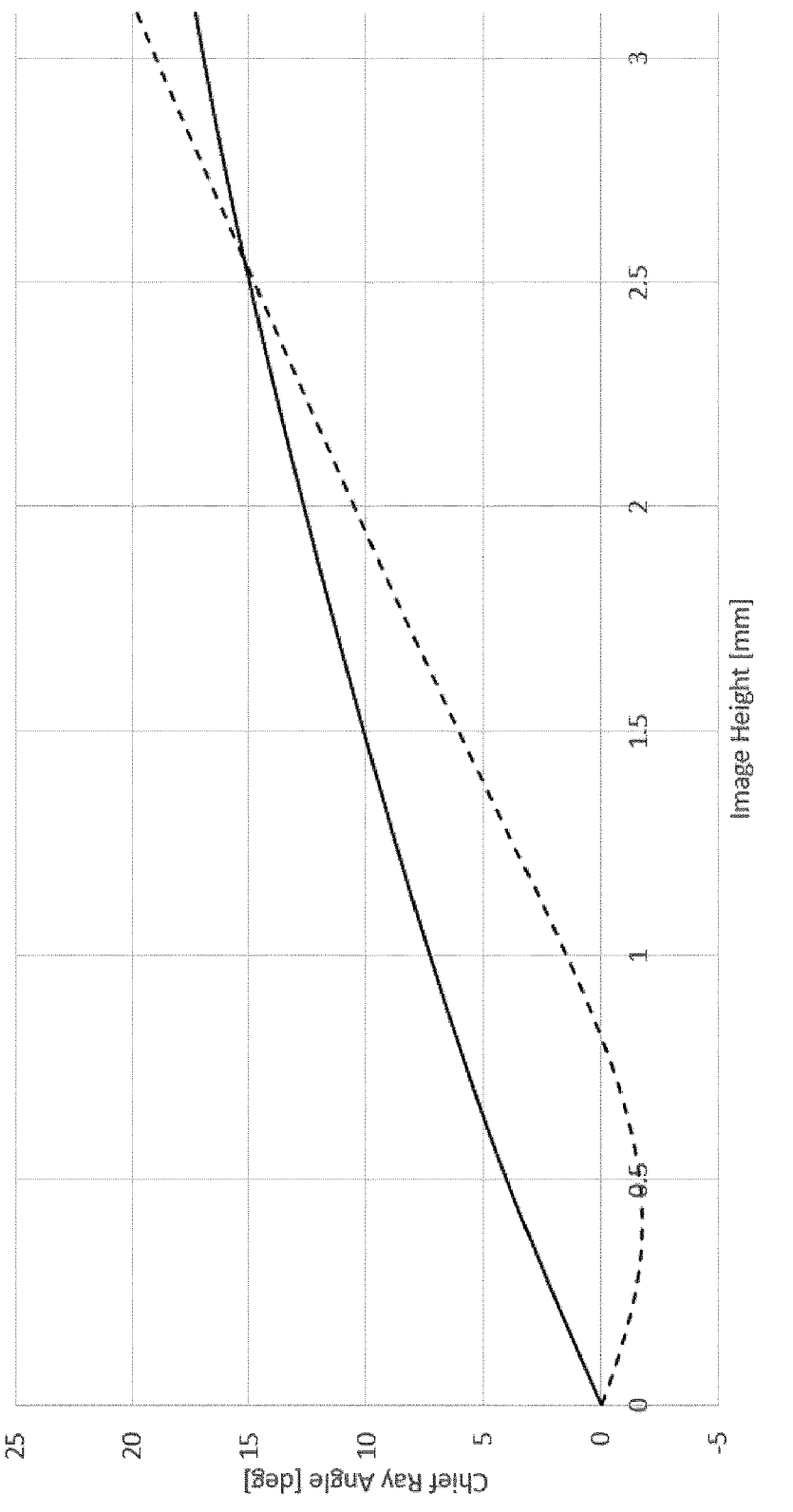
FIG. 13 is an example diagram illustrating the chief ray angle at the image surface and the stop plane of the imaging apparatus of FIG. 10 as a function of the image height.
Figure 14:
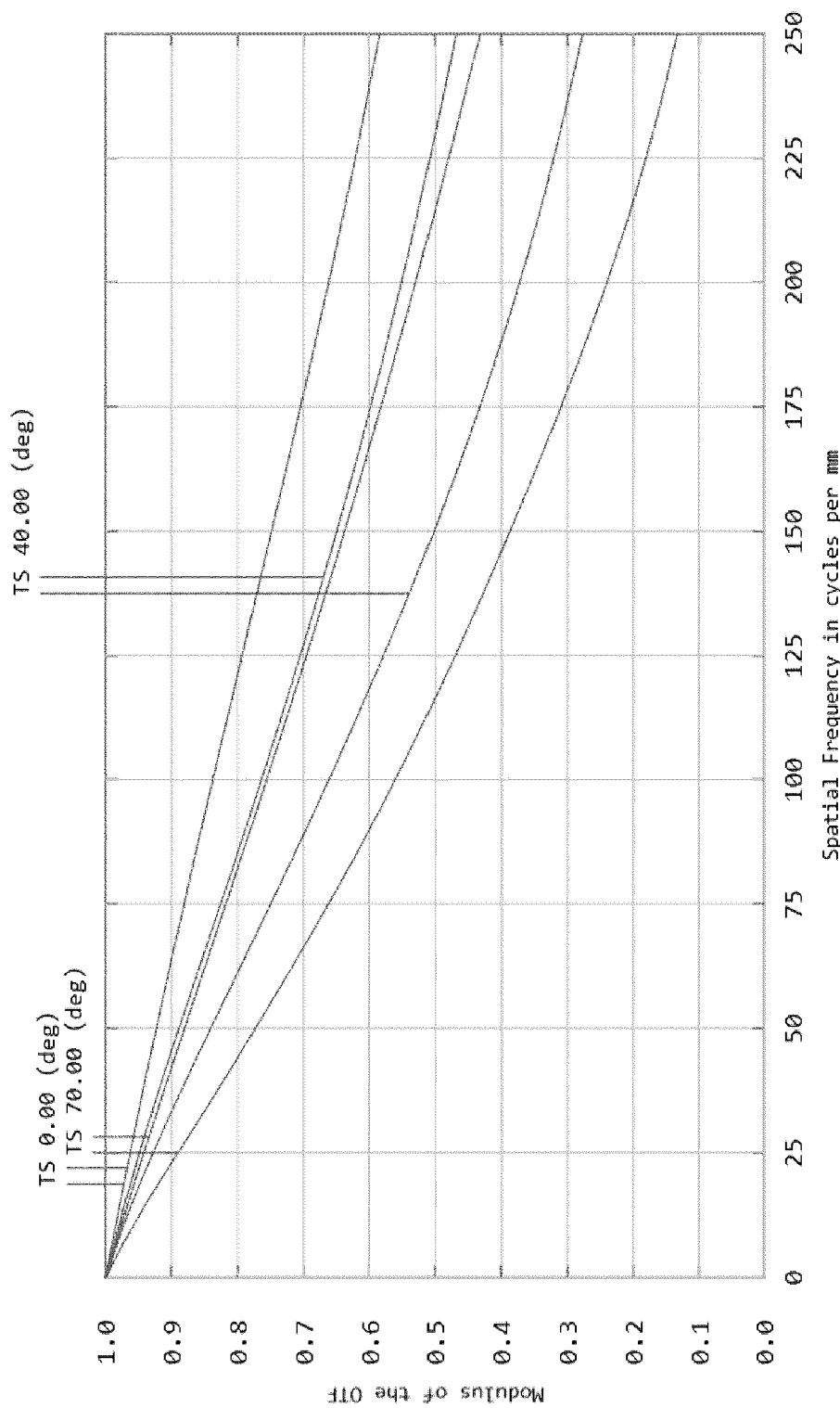
FIG. 14 is an example diagram illustrating the modulation transfer function of the imaging apparatus of FIG. 10 for on-axis as well as off-axis fields for infinite object distance.
Figure 15:
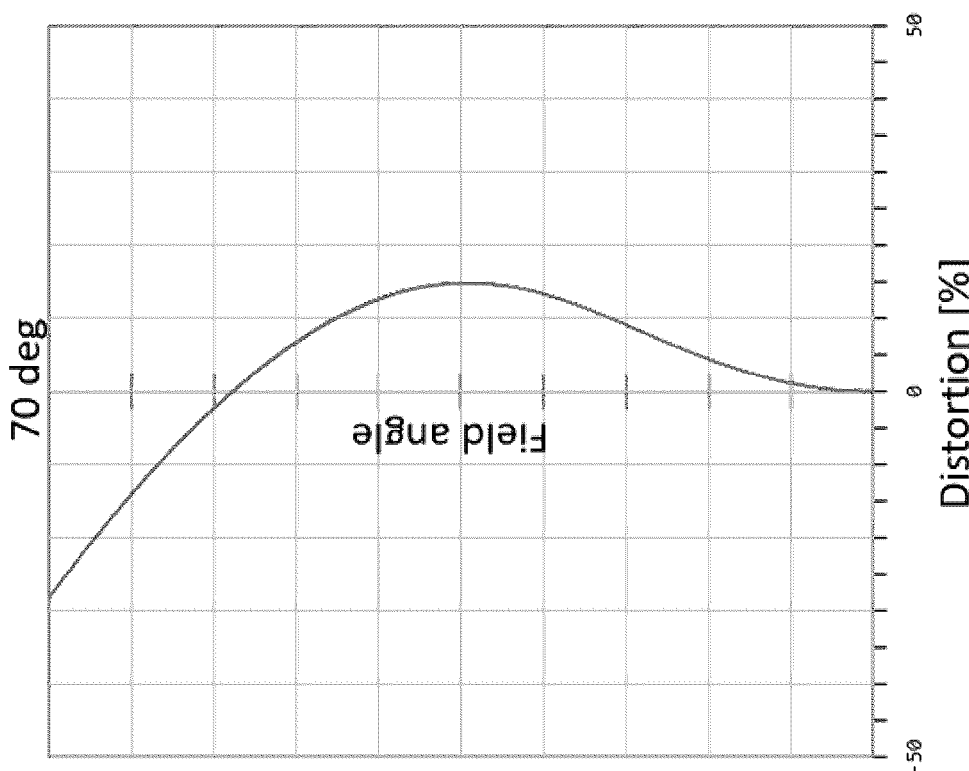
FIG. 15 is an example diagram illustrating the distortion as a function of the field angle of the imaging apparatus of FIG. 10.
Figure 16:
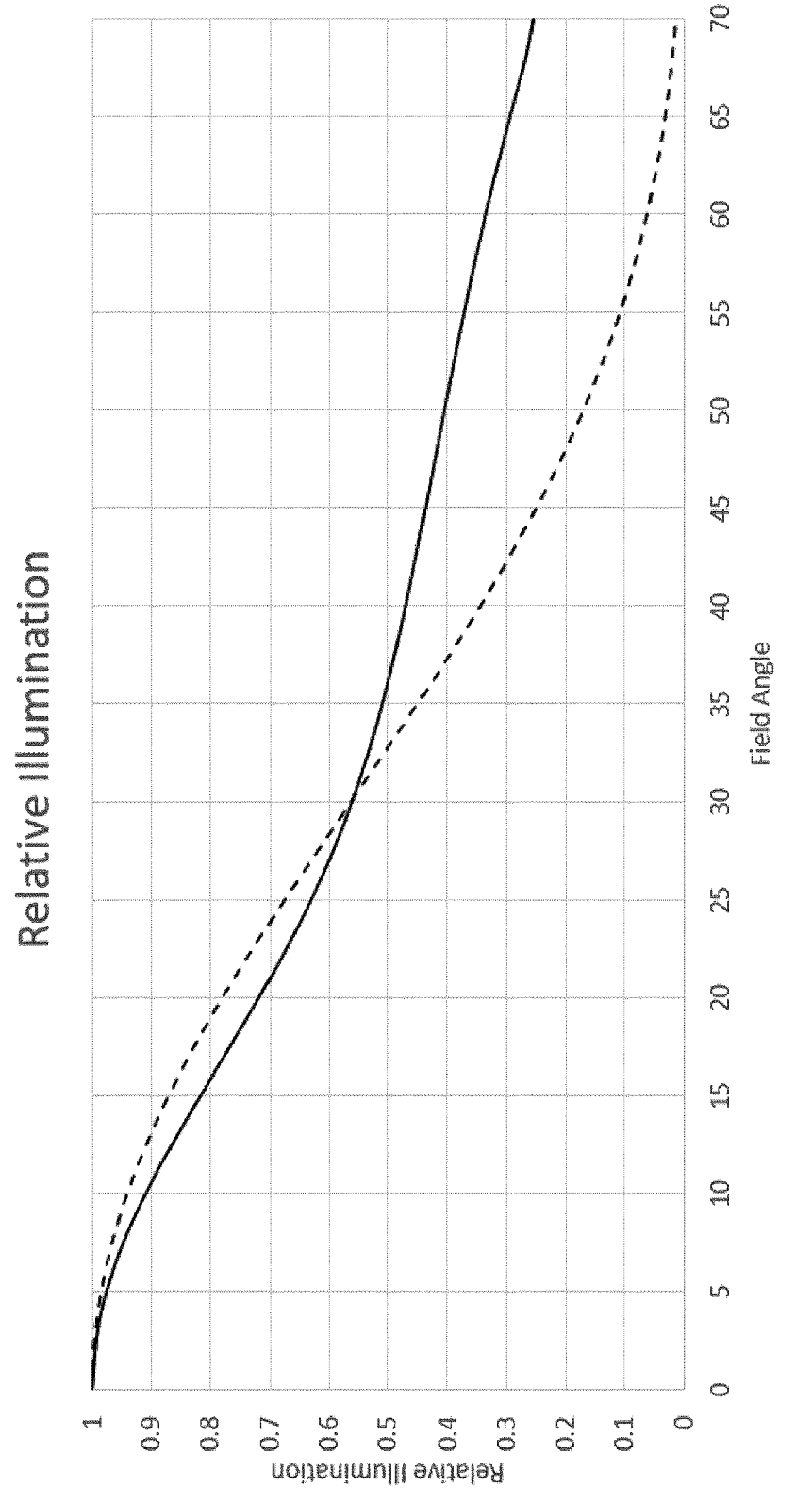
FIG. 16 is an example diagram illustrating the relative Illumination as a function of the field angle of the imaging apparatus of FIG. 10.

In the embodiment shown in FIG. 10, the second optics 230 has a focal length of 3.750 mm, wherein the first lens L3, the second lens L4, the third lens L5 and the fourth lens L6 of the second optics 230 have focal lengths of 7.705 mm, 4.910 mm, −2.960 mm and 2.694 mm, respectively. As in the case of the embodiment shown in FIG. 2, all the surfaces of the lenses L3-L6 of the second optics 230 are aspheric, meaning that they have a rotational symmetric sag profile. Their clear apertures are truncated down by two linear sides to maximize the clearance between the lenses L1, L2 of the first optics 210 and the lenses L3-L6 of the second optics, which in the embodiment shown in FIG. 10 is 0.9 mm. Semi horizontal and vertical widths of the clear apertures are given in the table shown in FIG. 11. As in the embodiment shown in FIG. 2, the third lens L5 of the second optics 230 of the imagining apparatus 200 shown in FIG. 10 can be moved along the second optical axis B for internal focusing. In the image plane the CRA ranges between −20 and +20 deg over the entire FOV of the imaging apparatus 200 of FIG. 10, as illustrated in FIG. 13. FIG. 14 illustrates the modulation transfer function (MTF) for infinite object distance for the imagining apparatus 200 shown in FIG. 10. As can be taken from FIG. 15, which illustrates the distortion as a function of the field angle, the imaging apparatus 200 of FIG. 10 provides a distortion within a range of −28.3% and +15%. In an embodiment, the lens distortion of the imaging apparatus 200 is within a range of −30% and +30% over the entire field of view of the imaging apparatus 200. As can be taken from FIG. 16, which shows a diagram illustrating the relative Illumination as a function of the field angle as well as the natural cosine-fourth-power law function for comparison, the imaging apparatus 200 of FIG. 10 has a relative illumination larger than 24% across the entire FOV.

The person skilled in the art will understand that the "blocks" (e.g., "units") of the various figures (e.g., method and apparatus) represent or describe functionalities of embodiments (rather than necessarily individual "units" in hardware or software) and thus describe equally functions or features of apparatus embodiments as well as method embodiments (unit=step).

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments may be integrated into one processing unit, or each of the units may exist alone physically, or two or more units are integrated into one unit.

The invention claimed is:

1. An imaging apparatus, comprising:
a first optics having a first optical axis;
a second optics having a second optical axis; and
a prism, wherein
    the prism is placed at an intersection of the first optical axis and the second optical axis,
    the first optics is configured to transmit light to the prism, the prism is configured to reflect light from the first optics to the second optics, and the second optics is configured to transmit light from the prism to an image surface,
    the first optics has a negative optical power, and the second optics has a positive optical power, the prism has an entrance surface configured to receive light from the first optics and a reflective inner surface configured to reflect light to the second optics,
    the entrance surface of the prism comprises a concave paraxial region, and
    the second optics comprises one or more lenses, and an entrance surface of the one or more lenses of the second optics closest to the prism is placed on the second optical axis at a distance from the prism smaller than or equal to a maximum clear aperture semi-diameter of the first optics.

2. The imaging apparatus of claim 1, wherein the first optical axis and the second optical axis intersect perpendicularly.

3. The imaging apparatus of claim 1, further comprising an aperture stop provided by the second optics.

4. The imaging apparatus of claim 1, further comprising an aperture stop, wherein the aperture stop is positioned between the prism and the second optics.

5. The imaging apparatus of claim 1, further comprising an aperture stop defined by an exit surface of the prism.

6. The imaging apparatus of claim 3, wherein the imaging apparatus has a chief ray angle range within −40 degrees and +40 degrees in a plane of the aperture stop over a field of view of the imaging apparatus.

7. The imaging apparatus of claim 1, wherein the prism has a flat exit surface.

8. The imaging apparatus of claim 1, wherein an exit surface of the prism comprises a paraxial region, wherein the paraxial region is concave or convex.

9. The imaging apparatus of claim 8, wherein the prism comprises a base prism and a lens adhesively bonded to an exit surface of the base prism.

10. The imaging apparatus of claim 1, wherein the prism comprises a base prism and a lens adhesively bonded to an entrance surface of the base prism.

11. The imaging apparatus of claim 1, wherein the first optics comprises a first lens and a second lens, wherein the second lens is placed after the first lens, the first lens has a negative optical power, and the second lens has a positive optical power.

12. The imaging apparatus of claim 1, wherein the one or more lenses of the second optics includes a first lens, a second lens, a third lens, and a fourth lens, wherein the first lens, the second lens, the third lens, and the fourth lens are placed after each other in this order, the first lens has a positive optical power, the second lens has a positive optical power, the third lens has a negative optical power, and the fourth lens has a positive optical power.

13. The imaging apparatus of claim 1, wherein the prism is configured to reflect light from the first optics to the second optics by total internal reflection, or wherein the reflective internal surface of the prism is provided by a reflective coating.

14. The imaging apparatus of claim 1, wherein the reflective internal surface of the prism is flat or the reflective internal surface of the prism has a freeform shape.

15. The imaging apparatus of claim 1, wherein each of the one or more lenses of the second optics has a rotationally symmetric sag profile with a truncated clear aperture at one or both linear sides thereof.

16. The imaging apparatus of claim 1, wherein a clearance between the first optics and the second optics is larger than 0.3 mm.

17. The imaging apparatus of claim 1, wherein the one or more lenses are movable along the second optical axis for focusing.

18. The imaging apparatus of claim 1, wherein a field of view of the imaging apparatus is between 130° and 180°.

19. A portable device, comprising:

an imaging apparatus, wherein the imaging apparatus comprises:

a first optics having a first optical axis;

a second optics having a second optical axis; and a prism, wherein the prism is placed at an intersection of the first optical axis and the second optical axis, the first optics is configured to transmit light to the prism, the prism is configured to reflect light from the first optics to the second optics, and the second optics is configured to transmit light from the prism to an image surface, the first optics has a negative optical power, and the second optics has a positive optical power, the prism has an entrance surface configured to receive light from the first optics and a reflective inner surface configured to reflect light to the second optics, the entrance surface of the prism comprises a concave paraxial region, and the second optics comprises one or more lenses, and an entrance surface of the one or more lenses of the second optics closest to the prism is placed on the second optical axis at a distance from the prism smaller than or equal to a maximum clear aperture semi-diameter of the first optics.

20. The portable device of claim 19, wherein the portable device includes a smartphone or a tablet computer.

\* \* \* \* \*